United States Patent [19]

Pettit

[11] 4,047,279

[45] Sept. 13, 1977

[54] UPGRADING CURRENT DISTRIBUTION INSULATORS

[75] Inventor: Ernest E. Pettit, Independence, Mo.

[73] Assignees: W. Leon Sell; Ernest E. Pettit; R. Don Sell, all of Independence, Mo.

[21] Appl. No.: 735,829

[22] Filed: Oct. 26, 1976

[51] Int. Cl.² .................... H02G 1/00; H01B 17/20
[52] U.S. Cl. ...................................... 29/426; 29/631; 174/150; 174/165; 174/195; 174/202
[58] Field of Search ........... 174/137 R, 141 R, 141 C, 174/148, 149 R, 150, 158 R, 165, 194, 195, 200, 202, 203, 204, 205, 206, 209, 210; 29/401 B, 426, 428, 469, 631

[56] References Cited

U.S. PATENT DOCUMENTS

| | | | |
|---|---|---|---|
| 1,109,470 | 9/1914 | Sandford, Jr. | 174/150 |
| 1,198,131 | 9/1916 | Jackson | 174/141 R |

FOREIGN PATENT DOCUMENTS

| | | | |
|---|---|---|---|
| 546,859 | 9/1922 | France | 174/150 |

*Primary Examiner*—Laramie E. Askin
*Attorney, Agent, or Firm*—Fishburn Gold & Litman

[57] ABSTRACT

A method is disclosed for upgrading insulators of a current distribution system when the voltage of the system is to be increased. New, additional insulators are coupled with the existing ones, and the coupling is accomplished without detachment of the current conductor from the existing insulator. The mounting stud for the existing insulator is unsecured from a support member, such as a crossarm, is detached from the existing insulator, and is thereafter attached to a new, additional insulator. The two insulators are then coupled together to provide increased electrical insulation, and the mounting stud is resecured to the supporting member. Time and materials are saved by not having to detach and reattach the conductor, and by reusing the existing insulator, the conductor attachment means, and the mounting stud.

5 Claims, 5 Drawing Figures

U.S. Patent  Sept. 13, 1977  4,047,279
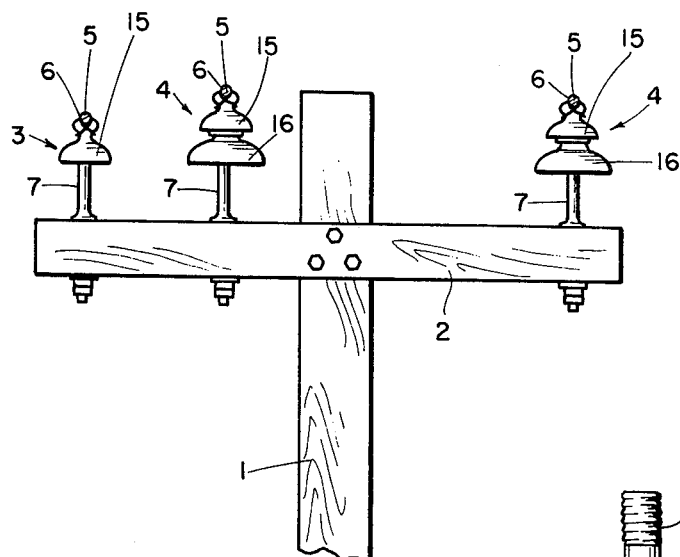
Fig. 1
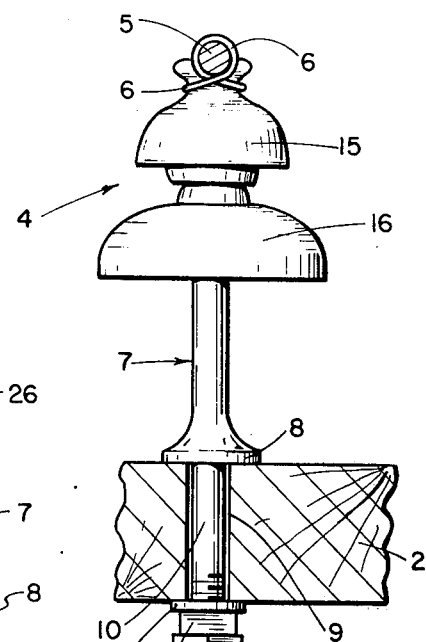
Fig. 2
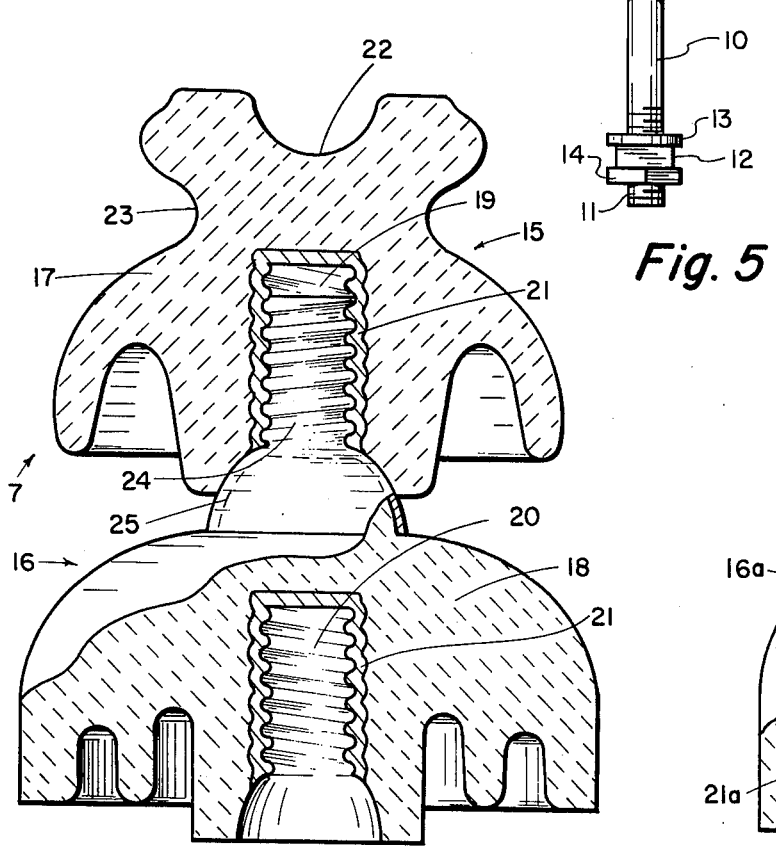
Fig. 5
Fig. 3
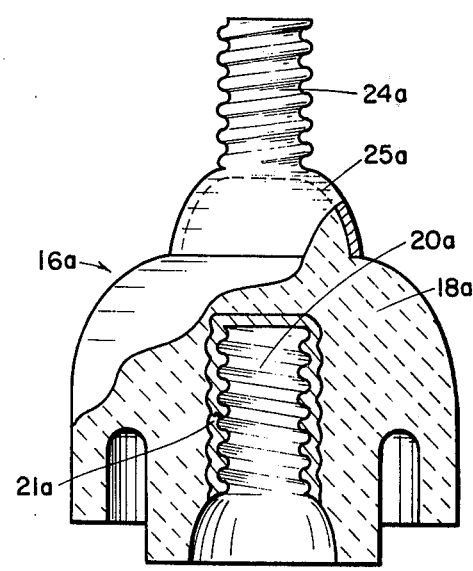
Fig. 4

UPGRADING CURRENT DISTRIBUTION INSULATORS

BACKGROUND OF THE INVENTION

This invention pertains to electric-current distribution systems, and more particularly to a method for upgrading insulators used with the power lines of such systems.

Current distribution systems built around 1925 were commonly designed for a voltage of 7200 volts. Many of these systems are presently being upgraded to handle 13,800 volts or 24,900 volts. To accomplish such upgrading, it is necessary to remove the wire ties which attach a current conductor to an insulator mounted on the crossarm of a pole, secure the power line in a safe, out-of-the-way place, remove the insulator mounting stud, remove the existing insulator from the mounting stud, install a replacement insulator having higher insulating specifications, and relocate and retie the power line on the replacement insulator. In addition to this time-consuming and expensive process of replacement, the old insulator and the removed tie wire are not retained and reused in the upgraded system, and the mounting studs must also be replaced when there will be insufficient clearance between the replacement insulator and the crossarm.

SUMMARY OF THE INVENTION

One object of the present invention is, therefore, to alleviate the inefficiency, wastefulness and expense that are associated with prior methods of upgrading the insulators in a current distribution system.

A specific object is to provide a method for upgrading insulators in a current distribution system whereby the existing insulators, the wire ties and the insulator mounting studs are retained as a part of the upgraded insulators.

Another object is to provide a method for upgrading insulators of a current distribution system whereby the existing insulators and wire ties are not removed and are thus maintained in use before, during and after the upgrading of the insulators.

Still another object is to provide a method of upgrading insulators in a current distribution system, in accordance with the previously stated objects, whereby new, additional insulators are coupled with the old, existing insulators to provide increased insulating capacity.

Other objects and advantages of the invention will become apparent from the following description, the drawings, and the appended claims.

The present invention is a method for upgrading an electriccurrent distribution system comprising the steps of:
  a. unsecuring an insulator mounting stud from a support member, an existing insulator being attached to the stud and a current conductor being attached to the insulator;
  b. detaching the mounting stud from the existing insulator;
  c. attaching the mounting stud to an additional insulator;
  d. attaching the additional insulator to the existing insulator; and
  e. resecuring the mounting stud to the support member.
The current conductor remains attached to the existing insulator during execution of the aforesaid steps. The mounting stud can be attached to the additional insulator before or after attachment of the two insulators, and the attachment of the mounting stud to the crossarm need only be loosened for inclusion of the additional insulator since its removal from the crossarm is not essential to accomplishment of the previously states steps.

BRIEF DESCRIPTION OF THE DRAWINGS

FIG. 1 is a fragmentary front elevational view of a power pole and a crossarm having two upgraded insulators thereon that were installed in accordance with the present method, and one existing insulator that is yet to be upgraded.

FIG. 2 is a fragmentary fron elevational view, in somewhat enlarged scale and partially in section, that shows details of the upgraded insulators of FIG. 1, the attachment thereof to the crossarm, and the attachment of the current conductor to the insulator.

FIG. 3 is an enlarged, side sectional view of the upgraded insulators shown in FIGS. 1 and 2, and which comprise an upper, existing insulator with a lower, additional insulator coupled thereto.

FIG. 4 is an enlarged sectional view of a somewhat smaller additional insulator that can be employed when practicing the method of the present invention.

FIG. 5 is a side view of a mounting stud that is used to secure the insulators shown in FIGS. 1-4 to the crossarm of the power pole.

DESCRIPTION OF PREFERRED AND ALTERNATIVE EMBODIMENTS

In FIG. 1, the power pole 1 has a stationary support member 2 thereon, sometimes hereinafter referred to as a crossarm, for support of insulators 3 and 4 and the attached current conductors 5. Conventional wire ties 6 are used to attach the conductors to the insulators, and the insulators are attached to the crossarm by means of mounting studs 7 having a base 8 that abuts the crossarm externally of a channel 9 therein. The mounting stud comprises an extension 10 that extends below the base 8, and has external threads 11 thereon. Nut 12 on threads 11 abuts washer 13 and is tightened to draw base 8 down against the crossarm 2 and thus rigidly secure the mounting stud and the attached insulator 4 on the crossarm. Nut 12 is loosened to unsecure the mounting stud on the crossarm, or nut 12 can be removed for detachment of the stud therefrom. Nut 14 is a lock nut to prevent undesired loosening of nut 12.

In FIG. 3, the upgraded insulator installed in accordance with the present method comprises an upper insulator 15 and a lower insulator 16. More specifically, the upper insulator exists in the current distribution system at the time the system is upgraded, and the lower insulator is a new, additional insulator that is installed to accomplish the upgrading. Both the upper and the lower insulators have a porcelain body, 17 and 18 respectively, and each has a central, axially extending, internally threaded channel therein, represented at 19 and 20 respectively, that is bounded by a conforming metal thimble 21 that is bonded to the body of the insulator. The upper, previously existing insulator 15 has a transversally extending top groove 22 therein, which receives a current conductor that is tried to the insulator, and medial, circumferential groove 23 for the wire ties 6 that are used to hold the conductor in place. The lower, additional insulator 16 has a coupling stud 24 that is made of metal and which extends axially from the top of the body 16 and is bonded thereto at junction 25 by means of a suitable bonding material. The internal channels 19 and 20 of the two insulators have the same diameter and have threads of the same type and pitch. Accordingly, the mounting stud 7 has external threads 26 of the same diameter, pitch and type as channels 19 and 20, as does the coupling post 24 of the lower insulator.

In carrying out the method of the present invention, a lineman first loosens nuts 12 and 14 to unsecure the mounting stud 7 from the crossarm so that it can be unscrewed from the insulator 3 (FIG. 1). It is not essential that the stud be removed from channel 9 of the crossarm. The additional insulator 16 can then be attached to the existing insulator 15 by means of the coupling stud, or the mounting stud can first be screwed into the additional insulator prior to the coupling thereof with the existing insulator, or else both insulators and the mounting stud can all be screwed together at the same time. Once the insulators and the mounting stud have been snugly fastened together, the mounting stud is resecured to support member 2 and upgrading of the insulator is thereby completed. It will again be pointed out that upgrading of insulators in accordance with the present method is accomplished without the untying and detachment of the current conductor. This feature in itself effects a great saving in labor cost, not to mention savings in tie wire costs and continued utilization of the existng insulator.

As shown in the drawings, the mounting stud 7 is rotatable in channel 9 of the support member 2 when it is unsecured therefrom for detachment from the existing insulator 15. In other embodiments of the present invention, the mounting stud can be secured to the support member by some other means; e.g., with a drilled flange and lag bolts, and need not pass through a channel therein. It will further be appreciated that the existing and the additional insulators can have means other than internally threaded channels and studs for coupling and mounting on the support member, and that members other than a crossarm can be used as a support member.

As was previously indicated, FIG. 4 represents a smaller additional insulator than shown at 16 in FIG. 3, and is used with an existing insulator 15 when the current distribution system is upgraded to a higher voltage, which is nonetheless lower than that for which the insulator shown in FIG. 3 is suitable. Since construction and use of the two additional insulators is otherwise basically the same, the same numbers are used for the same parts in FIGS. 3 and 4, except for usage of the suffix a in the numbers of the latter.

A method of upgrading insulators in current distribution systems has now been described in detail, and even though the present invention has been described with reference to particular embodiments thereof, it will be understood that even other embodiments will become apparent which are within the spirit and scope of the invention defined in the following claims.

What is claimed and desired to secure by Letters Patent is:

1. A method for upgrading a current distribution system which includes a support member for an insulator, a mounting stud that is externally threaded at one end and the other end of which is secured to the support member, an existing insulator having a threaded receptacle therein and which is thereby attached to the threaded end of the mounting stud, and a current conductor attached to the existing insulator, comprising the steps of:

a. unsecuring said mounting stud from said support member, said mounting stud when unsecured being rotatable within a channel which extends through said support member, the mounting stud having a base that abuts the support member externally of said channel and an extension below the base which passes through said channel and external threads on the outer end of said extension and a nut on said threads, and wherein the mounting stud is unsecured by loosening the nut without removing the same from said stud;
   b. detaching the mounting stud from the existing insulator by rotation of the stud as it remains within said channel, said existing insulator including an upper conductor receiving means wherein the current conductor is received and including securing means connected with said insulator and said current conductor for retaining said current conductor with respect to said insulator and preventing relative rotation between said insulator and said current conductor;
   c. attaching said stud to an additional insulator;
   d. attaching the additional insulator to the existing insulator, and
   e. resecuring said stud to the support member, and wherein said current conductor remains attached to the existing insulator during execution of the aforesaid steps.

2. A method as in claim 1 wherein said additional insulator has an externally threaded coupling stud thereon and an internally threaded channel therein, said mounting stud is attached to the additional insulator by threaded attachement with the threaded channel therein, and said additional insulator is attached to the existing insulator by threaded attachment of said coupling stud of the additional insulator with the threaded receptacle in the existing insulator.

3. A method as in claim 2 wherein said mounting stud is first threadedly attached to said additional insulator, and the additional insulator is then threadedly attached to said existing insulator.

4. A method as in claim 2 wherin said additional insulator is first threadly attached to said existing insulator, and the mounting stud is thereafter attached to said additional insulator.

5. A method as in claim 2 wherein said additional insulator is attached to said existing insulator while said mounting stud is being attached to said additional insulator.

* * * * *